(No Model.)

G. W. KNAPP.
Sheet Metal Vessel.

No. 232,510.        Patented Sept. 21, 1880.

Witnesses:
Geo. A. Boyden,
A. E. Eader

Inventor:
George W. Knapp
By his Atty
Chas. B. Mann

UNITED STATES PATENT OFFICE.

GEORGE W. KNAPP, OF BALTIMORE, MARYLAND.

SHEET-METAL VESSEL.

SPECIFICATION forming part of Letters Patent No. 232,510, dated September 21, 1880.

Application filed May 14, 1880. (No model.)

*To all whom it may concern:*

Be it known that I, GEORGE W. KNAPP, a citizen of the United States, residing at Baltimore, in the county of Baltimore and State of Maryland, have invented certain new and useful Improvements in Sheet-Metal Vessels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improvement in attaching handles to sheet-metal vessels, and is particularly applicable to vessels provided with hinged covers.

The improvement will first be described, and the invention then designated in the claim.

In the present instance the improvement is shown applied to an ordinary coffee-pot, but is applicable to any other description of covered vessel to which handles are attached.

Figure 1:
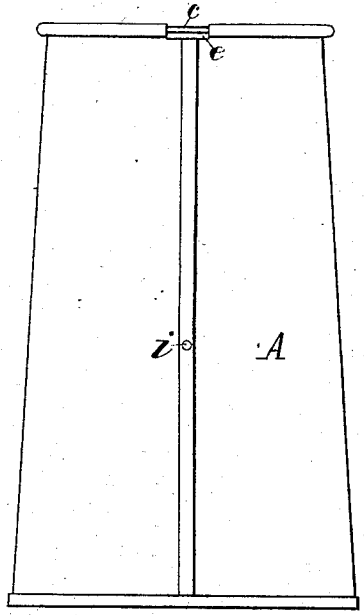
Figure 2:
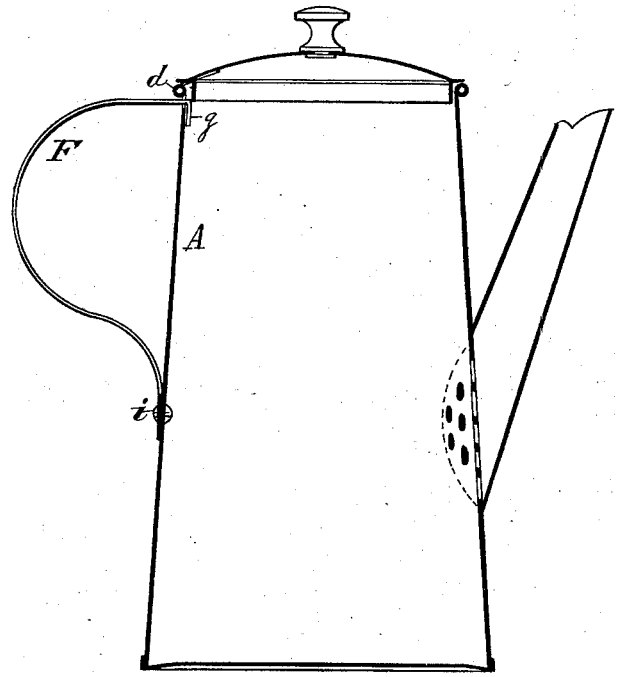
Figure 3:
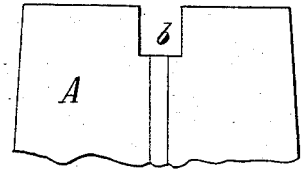
Figure 4:
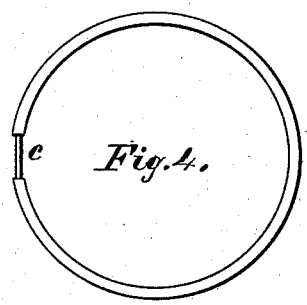
Figure 5:
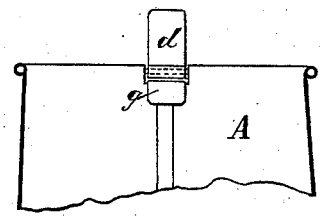
Figure 6:
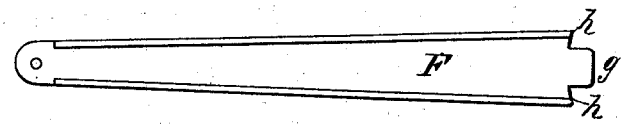

In the drawings annexed, Figure 1 is a view of the body of the vessel without the handle. Fig. 2 is a section of a vessel showing the handle and hinged cover. Fig. 3 is a side view of the upper part of the body of the vessel before the rim is beaded. Fig. 4 is a top view of the body of the vessel. Fig. 5 is a vertical section of the vessel, showing the relative position of the handle and hinge. Fig. 6 is a view of the handle before it is formed.

The letter A designates the body of the vessel, the upper edge of which is cut away, as shown at *b*, in Fig. 3. The depth of the said cut-away from the edge is greater than that required for the bead of the rim. A wire, *c*, is inserted in the beaded rim and extends straight across the cut-away part to serve as the pintle of a hinge, of which the loop part *d* is attached to the cover. The pintle of the hinge and the lower edge of the cut-away together form a slot, *e*.

The letter F designates the handle, which is blanked out and the edges beaded, as shown in Fig. 6. The upper end has a central projecting portion, *g*, which in width corresponds to that of the cut-away part on the body, and on each side of the central portion the cut-out part forms a shoulder, *h*, having a curve which corresponds with the curve of the cylindrical vessel to which it is to be attached. After the handle is bent to the proper form the projecting part *g* is placed in the cut-away part of the body, and is turned down against its inner side, as seen in Figs. 2 and 5, while the shoulder *h*, on each side of the handle, abuts against the outside of the body to which it is soldered. The lower end of the handle is riveted at *i* to the body and soldered in the usual manner. This construction of handle and the cut-away part in the body for its attachment is intended for vessels having hinged covers. The hinge, it will be seen, is immediately above the part *h* of the handle.

I do not herein claim the attachment of a handle to a sheet-metal vessel by forming a projection on one end of the handle and inserting the same through a slit made in the body and bending the projection to bring it in contact with the inner side of the body.

Having described my invention, I claim and desire to secure by Letters Patent of the United States—

In a sheet-metal vessel, the combination of the body having a cut-away part, *a*, in the upper edge, a wire in the beaded rim extending across the cut-away, the loop part of a cover-hinge to turn on the wire, and a handle having its upper end inserted through the cut-away part of the body below the hinge, as set forth.

In testimony whereof I affix my signature in presence of two witnesses.

GEORGE W. KNAPP.

Witnesses:
 CHAS. B. MANN,
 JNO. T. MADDOX.